United States Patent [19]

Schwelm

[11] Patent Number: 4,724,864

[45] Date of Patent: Feb. 16, 1988

[54] TWO-WAY FLOW CONTROL VALVE

[76] Inventor: Hans Schwelm, 37 rue Pere Conrad, Howald, G.D., Luxembourg

[21] Appl. No.: 908,706

[22] PCT Filed: Dec. 19, 1985

[86] PCT No.: PCT/LU85/00002

§ 371 Date: Aug. 21, 1986

§ 102(e) Date: Aug. 21, 1986

[87] PCT Pub. No.: WO86/03855

PCT Pub. Date: Jul. 3, 1986

[51] Int. Cl.$^4$ .............................................. G05D 7/06
[52] U.S. Cl. .................. 137/486; 137/487.5; 73/861.56
[58] Field of Search ............. 137/486, 487.5; 73/861.55, 861.56, 861.57

[56] References Cited

U.S. PATENT DOCUMENTS

| 2,388,672 | 11/1945 | Breaver | 73/861.55 |
|---|---|---|---|
| 3,182,500 | 5/1965 | Ishii | 73/861.57 |
| 4,194,394 | 3/1980 | Bartholomaus | 73/207 |
| 4,459,860 | 7/1984 | Walters | 73/861.55 |

FOREIGN PATENT DOCUMENTS 3015724 10/1981 Fed. Rep. of Germany .

Primary Examiner—Alan Cohan
Attorney, Agent, or Firm—Fishman & Dionne

[57] ABSTRACT

A two-way flow regulating valve with a hydraulic compensator (120) axially movable inside a cylindrical casing is intended to regulate the flow between an inlet opening an one or a plurality of discharge openings (10) radially arranged in the casing wall. A regulation valve (18) controls the position of the compensator, a flow rate sensor (20) detects the through flow rate and a displacement detector (32) detects the position of the flow sensor and controls the regulation valve (18) in relation to the position of the flow sensor. A compact construction is obtained by configuring the flow sensor (20) as a piston which is axially movable and coaxially arranged within the compensator (12).

7 Claims, 1 Drawing Figure

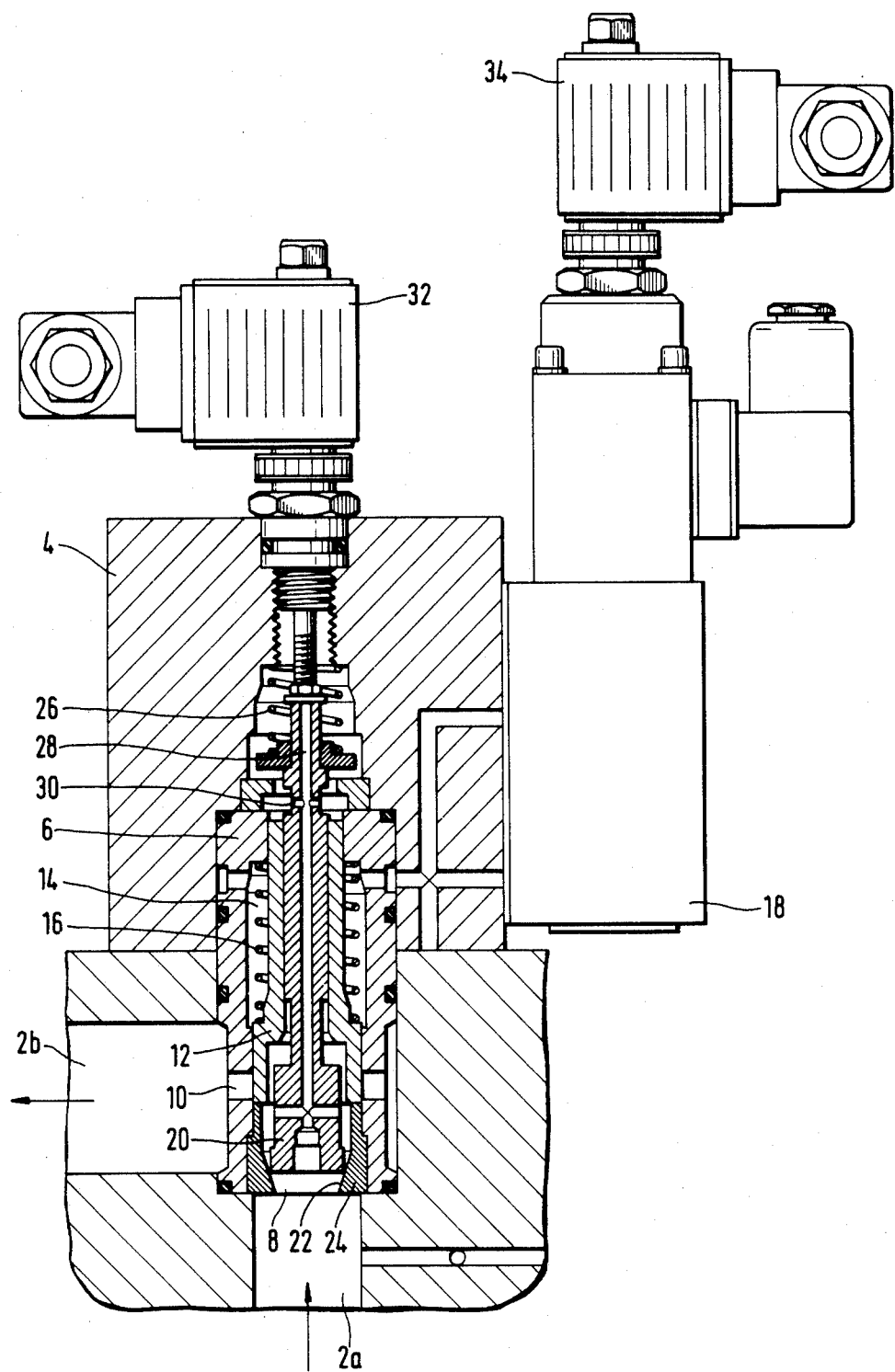

TWO-WAY FLOW CONTROL VALVE

The invention relates to a two-way flow control valve with a hydraulic compensator, which is axially displaceable in cylindrical housing, for the control of the flow through an inlet orifice and one or more outlet orifices provided radially in the housing wall, a control valve for controlling the compensator position, a flow sensor for detecting the flow quantity, a displacement transducer for detecting the position of the flow sensor and for controlling the control valve as a fuction of the position of the flow sensor.

Such valves are generally known and are used to detect and control the flow of a quantity of liquid in a line. The liquid concerned is usually oil, for example in hydraulic control devices, but the application is not confined to oil.

The present invention is based on the object of creating a novel valve of the above mentioned type with a more compact design than the conventional valves and which permits substantially faster switching times.

This object is achieved according to the invention by a valve of the type described above which has the features of the main claim.

Developments of the inventive idea are contained in the sub claims.

The invention is described in more detail below with reference to the enclosed drawing which shows a longitudinal section through a control valve according to the invention in closed position.

The two-way flow control valve shown in the figure is provided in the bend of a hydraulic line 2 and intended to control the flow in the direction of the arrow. The two-way flow control valve is fitted with its housing 4 in such a way that its piston sleeve is seated coaxially in the inlet section 2a and vertically in the outlet section 2b.

The base area of the cylindrical piston sleeve 6 is designed as inlet orifice 8, while one or more radial outlet orifices 10 are provided in the wall of the piston sleeve 6. The flow from inlet 8 in the direction of line section 2b is controlled by a hydraulic cylinder-shaped compensator 12 which is arranged in the piston sleeve 6 and is axially displaceable between a closed position (see figure) and a more or less opened position.

The upper, narrower part of the compensator 12 forms with the inner wall of the piston sleeve 6 a cylindrical annular space 14, in which a spiral spring 16 is arranged around the compensator 12. This spring is restrained between the upper base area of the piston sleeve 6 and a shoulder of the compensator 12, so that its action presses the compensator in the direction of the closed position.

The oil-filled annular space 14 is connected to a control valve 18, which controls the oil pressure in the annular space 14. The position of the compensator 12, and thus the flow through the orifice(s) 10, is consequently governed by the equilibrium between the sum of the expanding force of the spring 16 and of the oil pressure in the annular space 14 on the one hand and the oil pressure in the line section 2a on the other hand.

A flow sensor 20, designed as axially displaceable piston, is coaxially fitted inside the compensator 12. In closed position in accordance with the FIGURE, the lower edge of the sensor 20 is seated on the inner areas 22 of an insert 24 in the piston sleeve 6, which areas converge towards the orifice 8. When the sensor 20 is lifted off this inner area, the changing annular gap between the sensor 20 and the conical inner area forms the measuring point for detection of the flow. The opposite end of the flow sensor 20 is exposed to the action of a spiral spring 26 which bears on the one hand against the housing 4 and on the other hand against the flow sensor 20 and presses the latter in the direction of the closed position.

The flow sensor 20 is hydrostatically completely balanced by means of a longitudinal bore 28 and several cross bores 30.

The vertical position of the flow sensor 20 is determined by a displacement tranducer 32, known per se, preferably by electronic means. This displacement transducer 32, which thus detects the actual value of the flow in the direction of the arrow, is connected to the control valve 18 via a control unit 34 which determines the nominal value.

If the flow is too great, in other words if the flow sensor 20 is too "high", the oil pressure in the annular space 14 is increased via the control valve 18 to displace the compensator 12 in the direction of a reduction in the size of the outlet orifices 10. The position of the flow sensor 20 adapts under the action of the spring 26 to the reduction of the flow. This process continues until the actual value of the flow is equal to the nominal value.

If the flow is too small, which is determined by too "low" a position of the flow sensor 20, the oil pressure in the annular space 14 is reduced via the control valve 18, which has the consequence that the compensator 12 moves upward under the action of the pressure in the line section 2a and increases the size of the outlet orifices 10.

The flow becoming greater as a result thereby presses the flow sensor 20 against the action of the spring 26 and this change in position of the sensor 20 is again detected by the displacement transducer 32. This process continues until the actual value of the flow is equal to the nominal value.

The coaxially nested design of the flow sensor and of the compensator makes a very compact design possible. These two parts can, together with the piston sleeve 6, be screwed as a cartridge into any housing.

What is claimed is:
1. Two-way flow control valve comprising:
   a housing including a housing wall having an inlet orifice and at least one outlet orifice through said wall, said outlet orifice radially positioned with respect to said inlet orifice, said housing also including a longitudinal bore therethrough, said inlet and outlet orifices communicating with said bore;
   hydraulic compensator means for controlling flow through said inlet and outlet orifices, said compensator means being disposed in said bore and being axially displaceable in said bore of said housing, said compensator means having a longitudinal opening therein;
   control valve means for controlling the axial position of said compensator means;
   flow sensor means for detecting the quantity of flow through said inlet aperture, said flow sensor means comprising an axially displaceable piston mounted coaxially in said longitudinal opening of said compensator means;
   displacement transducer means for detecting the axial position of said flow sensor means and for controlling said flow control valve means as a function of the position of said flow sensor means;

said inlet orifice communicating with said flow sensor means at an annular section having a cross section that diverges away from said inlet orifice and toward said flow sensor means, said diverging annular section terminating at an annular section of substantially constant cross section;

wherein said diverging annular section and said axially displaceable piston of said flow sensor means cooperate to form an annular flow gap having a width which is determined by the quantity of flow and the axial displacement of said flow sensor means.

2. The valve of claim 1 wherein:

said diverging annular section and said annular section of substantially constant cross section are provided in an annular insert in said bore of said housing.

3. The valve of claim 2 including:

compression spring means in said bore of said housing communicating with said flow sensor means, said spring means exerting force on said flow sensor means in the direction of said inlet orifice.

4. The valve of claim 2 including:

a longitudinal bore and at least one cross bore communicating with said longitudinal bore through said piston of said flow sensor means.

5. The valve of claim 2 wherein:

said bore in said housing is cylindrical.

6. The valve of claim 3 wherein:

said bore in said housing is cylindrical.

7. The valve of claim 4 wherein:

said bore in said housing is cylindrical.

* * * * *